July 23, 1963    J. J. HARRINGTON ET AL    3,098,340
PEANUT VINE FEED CONTROL DEVICE
Filed Jan. 14, 1960    2 Sheets-Sheet 1

INVENTORS
Joseph J Harrington
John D Mitchell
Bertram L Jordan by Estabrook & Philpitt Their Attorneys July 23, 1963

J. J. HARRINGTON ET AL 3,098,340

PEANUT VINE FEED CONTROL DEVICE

Filed Jan. 14, 1960

INVENTORS
Joseph J Harrington
John D Mitchell
Bertram L Jordan by Estabrook & Philpitt Their Attorneys

United States Patent Office 3,098,340
Patented July 23, 1963

3,098,340
PEANUT VINE FEED CONTROL DEVICE
Joseph J. Harrington, General Delivery, Lewiston, N.C.;
John D. Mitchell, General Delivery, Woodville, N.C.;
and Bertram L. Jordan, General Delivery, Lewiston, N.C.
Filed Jan. 14, 1960, Ser. No. 2,393
4 Claims. (Cl. 56—345)

Introduction

This invention generally pertains to a novel machine for harvesting peanuts. More particularly, this invention pertains to a peanut harvester having a unique combination of means for picking up vines and attached peanuts lying on the ground and feeding them to the other parts of the harvester.

Background

There are a number of peanut digging machines currently on the market which are designed to uproot peanut vines and the attached peanuts from the earth and to deposit them upon the surface of the earth so that they will have adequate opportunity to air and dry in the sun. Such peanut digging machines are generally used in conjunction with a separate peanut harvesting machine which is designed to subsequently pick up the dried vines and peanuts from a windrow and deliver them to a section of the harvester which is designed for separating the peanut vines from the peanuts.

However, peanut harvesting machines frequently encounter field and weather conditions which render the gathering and harvesting of peanut vines difficult and much less efficient than would be possible under ideal conditions. One such adverse field condition is that which exists when the peanut vines and attached peanuts become easily "shatterable," which is another way of saying that the peanuts are in such a condition that they can be easily detached from the peanut vines under the influence of very little force or movement. Such a "shatterable" condition exists for instance when the vines and peanuts are extremely dry or when the vines and attached peanuts have been allowed to remain in the field under moisture conditions which weaken or rot the bond between the peanuts and the peanut vines. When the peanut vines and attached peanuts are easily "shatterable," considerable care must be exercised to avoid shifting or movement of the vines with too great a force during the picking up operation, since separation of the peanuts from the vines means that the peanuts will fall upon the ground and be essentially non-recoverable.

With these facts in mind, it will be appreciated that serious problems face the peanut farmer who suddenly finds that it is expedient to pick up his windrowed peanut crop and harvest it earlier or faster than he had originally planned. For example, after peanut vines and attached peanuts have been uprooted and allowed to lie in windrows upon the ground to dry, the peanut farmer may suddenly decide that an impending rain will so spoil and rewet his crop that it is almost mandatory that he pick up the peanut crop at the earliest possible moment. Such accelerated pick up procedures present a number of problems, particularly when the peanut farmer has a considerable number of acres. When such situations occur, the peanut farmer is often forced to attempt to pick up his peanut crop at the fastest possible pace. However, most peanut pick-up and harvesting machines are quite limited insofar as their maximum effective pick-up rate is concerned. More specifically, with regard to the pick-up portion of many peanut harvesting machines which comprises a rotating conveyor-like arrangement of pick-up fingers, increasing the forward speed of the pick-up portion often merely serves to increase the centrifugal force of the pick-up fingers to such an extent that the vines, instead of being gradually and regularly carried around the lower portion of a conveyor surface with the pick-up fingers, are flung or "kicked" outwardly and forwardly from the fingers by virtue of the added increment of centrifugal force imparted by the forward speed of the harvesting machine. When the peanut vines are thrown or "kicked" outwardly and forwardly from the fingers in this fashion the vines not only tend to accumulate into unmanageable balls or heaps but also the peanuts themselves are frequently prematurely detached from the peanut vines, particularly if the peanut crop is in a shatterable condition as described earlier. Peanuts which fall upon the ground cannot be recovered with present peanut harvesters and constitute a loss which is directly attributable to the desire for an increased speed of pick-up.

Peanut farmers have sometimes attempted to overcome some of the aforesaid disadvantages of accelerated pick-up by changing the gearing arrangement which moves the pick-up fingers, so that the pick-up fingers will move with less speed relative to the ground. However, the changing of gear arrangements is often a somewhat difficult and time-consuming task, necessitating additional parts, tools and a certain degree of mechanical skill. In addition, changing gear arrangements is often quite impractical for the reason that the condition of a peanut farmer's crop may vary considerably from one acre to the next or from one field to the next and may even vary during different portions of the day. If a peanut farmer should attempt to change the gearing arrangements on his harvesting machine in order to meet so many varying conditions it would consume an excessive amount of his time.

Objects

It is, therefore, an object of this invention to provide a novel device which can be attached to nearly any peanut harvesting machine and which will permit the operator of the harvester to satisfactorily operate at greater ground speeds than he would otherwise be able to do. Another object of this invention is to provide a novel peanut vine feed control device which elminates the need for the operator of a peanut harvester to change the gearing arrangements in the feed section of the harvester in order to acquire greater ground pick-up speed. A further object of the invention is to provide a novel feed device for use in conjunction with the pick-up section of a peanut harvester which will permit the harvester to be operated at greater ground speeds without "kicking-forward" or "balling-up" the peanut vines which lie in the path of the harvester. Another object is to improve the operating efficiency of the peanut harvester by providing a smooth, even flow of vines into the "stripping" section of the machine which results in less "jamming or clogging" and a more complete separation of nuts from peanut vines. An additional object of the invention is to minimize the loss of potentially "shatterable" peanuts which were heretofore lost due to jamming, clogging and "kicking-forward." Still another object of this invention is to minimize the formation of wads and lumps which cause damage to harvester machines.

These and other objects are accomplished by the parts, elements, constructions, arrangements and combinations which comprise the present invention, the nature of which is set forth in the following general statement, a preferred embodiment of which is set forth in the following description and illustrated in the accompanying drawings, and which is particularly and distinctly pointed out and set forth in the appended claims forming a part hereof.

Figure 1:
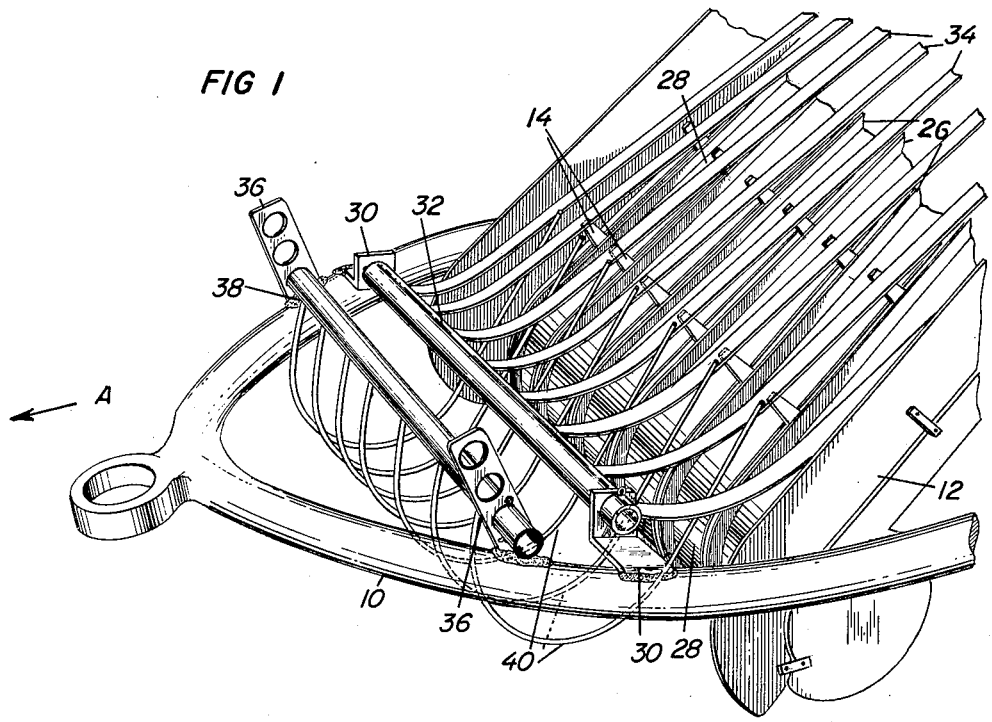
FIGURE 1 is a fragmentary perspective view of a peanut harvester incorporating the novel device of this invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Peanut harvesters which utilize an inclined feed conveyor arrangement are well known in the prior art. Since such feed conveyors are well known and since the particular manner of their construction forms no part of this invention, no detailed drawings have been presented to such feed conveyor arrangements in their entirety. It is believed that the general operation of such feed conveyor arrangements can best be illustrated by the sketches shown in FIGURES 2, 3 and 4. The pick-up fingers 14 of feed section 12 move in the directions indicated by arrows B. At the point where the pick-up fingers most closely approach the ground (i.e., from a fraction of an inch to several inches from the ground) the pick-up fingers move around the lower end C of the feed section and in doing so sweep in a simultaneous forward and upward direction. By this action peanut vines which are lying in the path of the feeder are swept up off the ground 18 and carried upwardly and rearwardly of the feeder. This action is probably most clearly shown by FIGURE 3, where the numeral 20 represents the peanut vines which are to be picked up and the numeral 21 indicate the peanut vines which have been picked up by the feeder.

Figure 2:
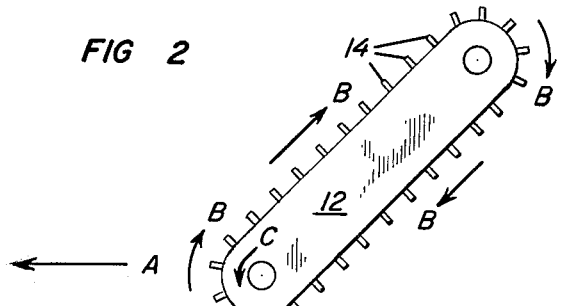
FIGURES 2, 3 and 4 are sequential side views representing the inclined conveyor section of a conventional peanut harvester and showing the manner in which such harvesters frequently operate upon vines.
Figure 3:
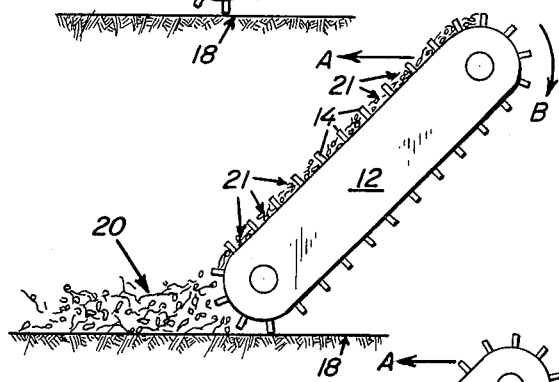
Figure 4:
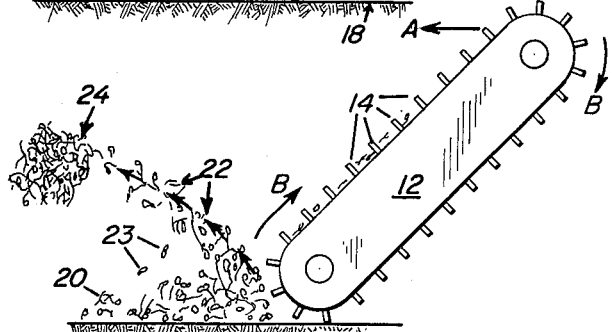

The arrangement shown in FIGURES 2 and 3 works satisfactorily under normal conditions, but as stated earlier, when it is necessary or highly desirable for the peanut farmer to operate his harvester at the maximum possible speed, the aforementioned difficulties of "kicking" can occur. FIGURE 4 represents an attempt to illustrate this "kicking" action, balls 22 and 24 representing clumps of peanut vines being propelled upwardly and forwardly of the feeder section instead of being smoothly fed up onto the feed section in the manner shown in FIGURE 3.

Continued "kicking" of peanut vines not only results in the formation of troublesome mounds and balls of excessive size, but in addition "kicking" is undesirable in that it causes the peanuts 23 to become loosened from the vines and drop upon the ground, where it is not practical to recover them.

Heretofore no practical means had been presented for solving this problem. As a consequence peanut farmers have often been forced to take unnecessary losses in their peanut crops and to incur additional expenses simply because they were not able to pick up the peanut vines quickly enough or without balling and "kicking."

We have developed what has proven to be a most satisfactory solution to the aforementioned problems. The novel device of the present invention can be characterized by the following features:

(a) A plurality of spaced apart approximately U-shaped restraining means the number of restraining means preferably being approximately the same as the number of pick-up fingers in a horizontal row of the feed section of the peanut harvest, (b) Each of said spaced apart restraining means being disposed in separate vertical planes which are parallel to each other, (c) Each of said U-shaped restraining means being characterized by an open end which faces upwardly and which is inclined slightly toward the rear of the harvester, a closed curved bottom end section which generally points downwardly and forwardly, a front leg section, and a back leg section which is preferably slightly longer than said front leg section, (d) The upper extremity of each of said front leg sections of said restraining means being joined to an elongated support member which is disposed horizontally across the front of the harvester a predetermined distance above the ground, (e) The said closed curved bottom end sections of said plurality of restraining means being disposed approximately eight inches above the ground at their lowermost extremities, (f) The back leg sections of said restraining means extending in a generally backward and upward direction, the minimum distance between said back leg sections and the feed surface of the harvester being approximately eight inches, (g) Said plurality of restraining means being freely swingable through a vertical plane in a generally upward and backward direction by virtue of the fact that the said elongated support member which is attached to the upper extremity of each of said restraining means front sections is pivotably mounted.

FIGURE 1 is a perspective view of a peanut harvester incorporating the novel device of this invention. It will be seen that a Y-shaped drawbar arrangement 10 is disposed along the sides and forwardly of an upwardly inclined feed conveyor section generally indicated by 12. The Y-shaped drawbar arrangement 10 not only serves as a means for pulling the feed conveyor section 12 over the ground in the direction indicated by arrow A (i.e., with the aid of a tractor) but in addition it serves to position the feed conveyor section a predetermined distance about the ground. The feed conveyor arrangement partially shown in FIGURE 1 is well known in the peanut harvesting art, as has been noted previously, and as is generally shown in FIGURE 2. It consists of a plurality of rows of aligned pickup fingers 14 which are designed to move continuously thorugh a plurality of spaced pick-up fingers guide slots 26. Guide slots 26 are in turn formed by adjacent spaced apart stationary feed trackways 28.

As shown in FIGURE 1, bracket arrangements 30 are provided on each forward side of drawbar 10, and these brackets are adapted to contain an elongated rod 32. Elongated rod 32 is preferably pivotally mounted within said brackets 30, but it would obviously not amount to invention for those skilled in the art to mount said rod 32 fixedly within said brackets 30. A plurality of substantially flat J-shaped metal straps 34 are attached to elongated rod 32 at spaced intervals, and such straps are positioned so as to extend backwardly and upwardly between the moving pick-up fingers 14 and above a portion of the feed trackways 28. The primary function of straps 34 is to more-or-less hold the vines down during their upward movement along the conveyor feed surface and to protect them from being blown off the feed surface by wind. This arrangement of "hold-down" straps and similar arrangements are known in the prior art.

Figure 5:
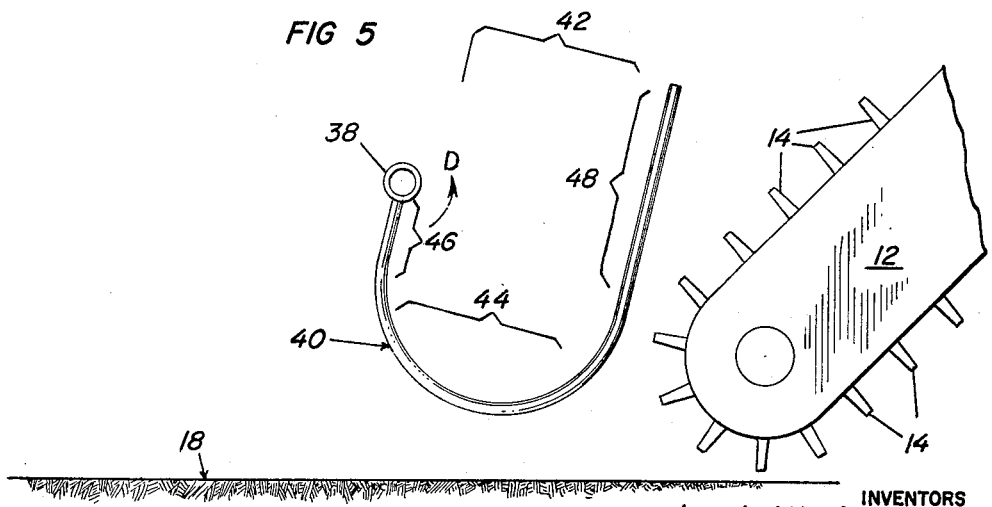
FIGURE 5 is a diagrammatic view of the novel features of this invention and is designed to show the spatial relationship of the elements thereof with the bracket interconnecting members 40 and 12 removed for purposes of clarity.

As is also shown in FIGURE 1, another set of bracket members 36 is also positioned on the forward side of drawbar 10 and these brackets are adapted to hold an elongated rod-like member 38. Elongated rod-like member 38 is preferably pivotably mounted within bracket member 36 so that member 38 can freely pivot therein. A plurality of approximately U-shaped restraining means 40 (the number of restraining means preferably being approximately the same as the number of pick-up fingers in the feed section of the peanut harvester) are attached to member 38 at spaced intervals. The relative positional relationship of the restraining means 40, the member 38, the pick-up fingers 14, the feed section 12 and the ground 18 are illustrated in FIGURE 5. Each of said spaced apart restraining means are disposed in separate vertical planes which are parallel to each other. Each of said U-shaped restraining means is characterized by an open end 42 which faces upwardly and which is inclined slightly toward the rear of the harvester, a closed curved bottom end section 44 which generally points downwardly and forwardly, a front leg section 46, and a back leg section 48 which is preferably slightly longer than said front leg section. The upper extremity of said front leg sections of said restraining means is joined to the elongated support member 38 which, as noted previously, is disposed horizontally across the front of the harvester a predetermined distance above the ground. The closed curved bottom end sections 44 of said plurality of restraining means are preferably disposed approximately eight inches above the ground 18 at their lowermost extremities. The back leg sections 48 of said restraining means extend in a generally backward and upward direction, the minimum distance between said back leg sections and the feed surface of the harvester preferably being approximately eight inches. The plurality of restraining means 40 are each freely swingable through vertical planes in a generally upward and backward direction (as is indicated by the dotted arrow D) by virtue of the fact that the said elongated support member 38 which is attached to the upper extremity of each of said restraining means front sections is preferably pivotably mounted. The fact that the restraining means are freely swingable in this fashion permits them to readily accommodate unusually large piles of vines which, for one reason or another, may occasionally accumulate in the peanut field.

Figure 6:
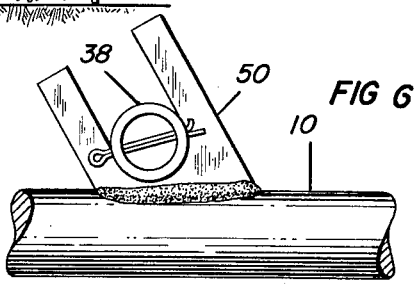
FIGURE 6 is an enlarged fragmentary view of a modification of the invention showing the manner in which the elongated support members may be supported on the front frame of a peanut harvester.

An alternative method for permitting the restraining means to accommodate unusually large piles of vines is to mount the support member 38 in a slotted bracket 50 as is shown in FIGURE 6. Support member 38 will then ride up and down within slotted bracket 50 to an extent depending upon the size of the piles of vines which are encountered.

Figure 7:
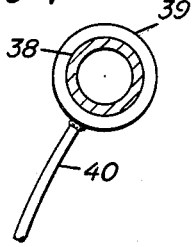
FIGURE 7 is an enlarged fragmentary view of a modification of the invention illustrating another way in which the tines can be attached to a support member.

Still another method of having the restraining means accommodate large masses of vines is to mount the restraining means 40 on the support member 38 in such a manner that each restraining means is freely rotatable and independent of the action of every other restraining means. This could be accomplished, for example, by fixing each of the restraining means 40 to a ring 39 (see FIGURE 7), the ring 39 being freely rotatable around support member 38. Other arrangements will readily occur to those skilled in the art.

While those skilled in this art will probably think that the novel pick-up restraining means (40) of this invention can be used alone on the feed section of a peanut harvester (that is, without the J-shaped straps 34), considerable advantages and superior operation is obtained when both the restraining means and the J-shaped straps are used in the feed section. The exact reason for the superior performance which results from the use of both the restraining means and the straps of the vine press is not known. However, it has been observed that unexpectedly superior performance does result from this combination.

The advantages of the novel feeding device of this invention may be summarized as follows:

(1) With the present invention the peanut vines can be picked up at a much faster rate than when not using the novel device;

(2) The present invention avoids the "kicking" problems of prior art peanut harvesters;

(3) The present invention decreases the loss of peanuts which would ordinarily be lost under accelerated pick-up conditions;

(4) The present invention permits a peanut farmer to operate his peanut combine both at low speeds and high speeds without the need for any special mechanical changes or precautions;

(5) The present invention permits a peanut farmer to increase his maximum suitable ground speed from about 2 to about 4 miles per hour.

In conclusion, while there has been illustrated and described a preferred embodiment of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims. Having thus described our invention, what we claim as new and desire to secure as United States Letters Patent is:

1. In the known combination of a peanut combine comprising a harvester section and a pick-up feed section, wherein the feed section comprises an inclined feed conveyor surface which is continually swept by a plurality of rows of aligned pick-up fingers, the improvement which comprises a plurality of spaced apart approximately U-shaped restraining means, each of said spaced apart restraining means being disposed in separate vertical planes which are parallel to each other, each of said U-shaped restraining means being characterized by an open end which faces upwardly and which is inclined slightly toward the rear of the havester, a closed curved bottom end section which generally points downwardly and forwardly, a front leg section, and a back leg section which is preferably slightly longer than said front leg section, the upper extremity of each of said front leg sections of said restraining means being joined to an elongated support member which is disposed horizontally across the front of the harvester a predetermined distance above the ground, the said closed curved bottom end sections of said plurality of restraining means being disposed approximately eight inches above the ground at their lowermost extremities, the back leg sections of said restraining means extending in a generally backward and upward direction, the minimum distance between said back leg sections and the feed surface of the harvester being approximately eight inches, said plurality of restraining means being freely swingable through a vertical plane in a generally upward and backward direction by virtue of the fact that the said elongated support member which is attached to the upper extremity of each of said restraining means front sections is pivotably mounted, said restraining means being disposed in advance of said conveyor.

2. The apparatus according to claim 1 wherein said elongated support member is mounted in a slotted bracket so as to permit the said support member to freely ride up and down therein.

3. The apparatus according to claim 2 wherein each of said restraining means is independently and rotatably mounted on said elongated support member.

4. The apparatus according to claim 3 wherein a plurality of J-shaped straps comprising a vine press are positioned along the front and top of the fed section of the harvester and which in conjunction with the aforesaid restraining means provide superior performance of the feed section of the peanut harvester.

References Cited in the file of this patent

UNITED STATES PATENTS

| | | |
|---|---|---|
| 683,833 | Beck | Oct. 1, 1901 |
| 1,287,593 | Rodemeyer et al. | Dec. 10, 1918 |
| 1,309,861 | Lechtenberg | July 15, 1919 |
| 2,038,809 | Tallman et al. | Apr. 28, 1936 |